United States Patent Office 3,425,080
Patented Feb. 4, 1969

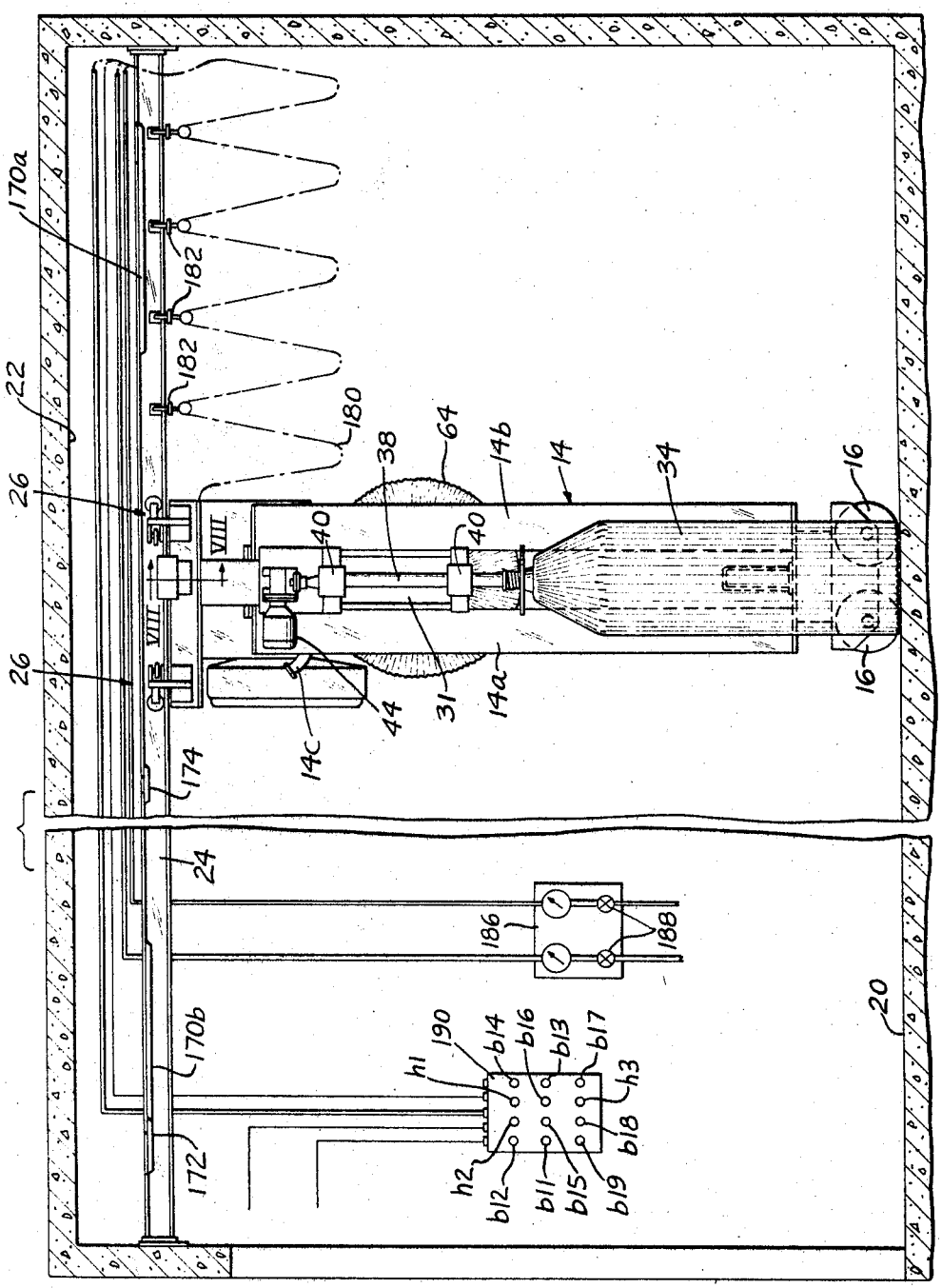

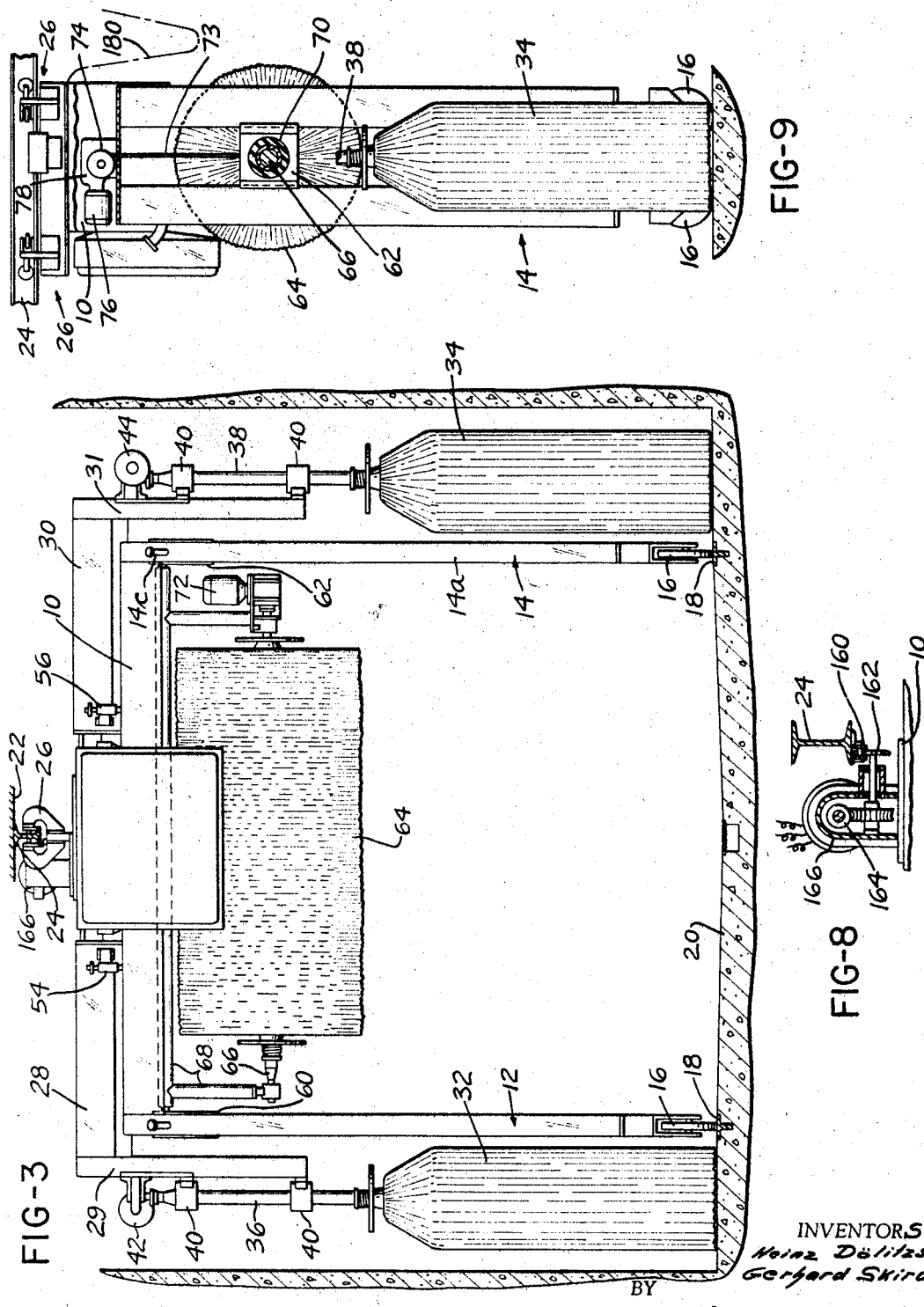

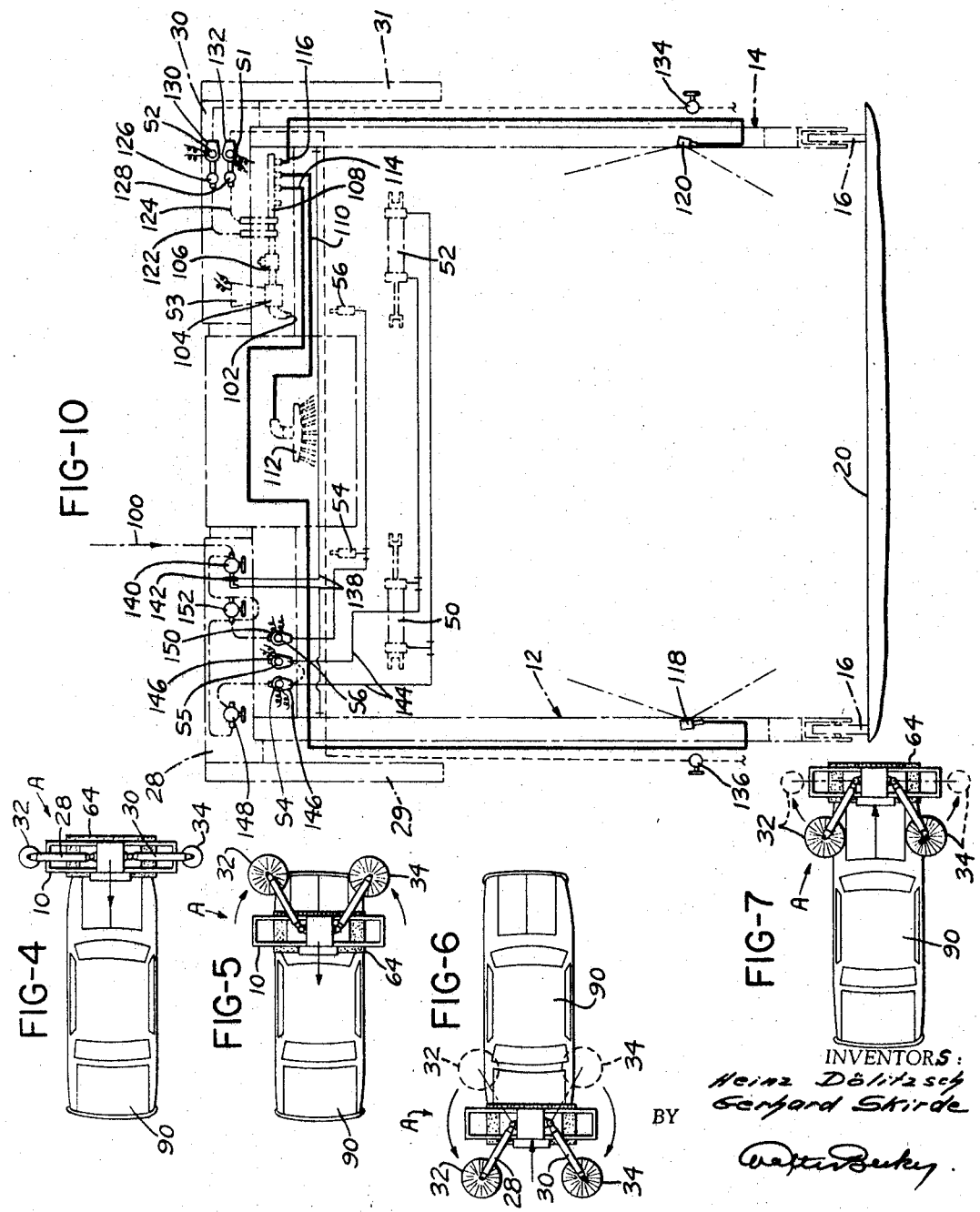

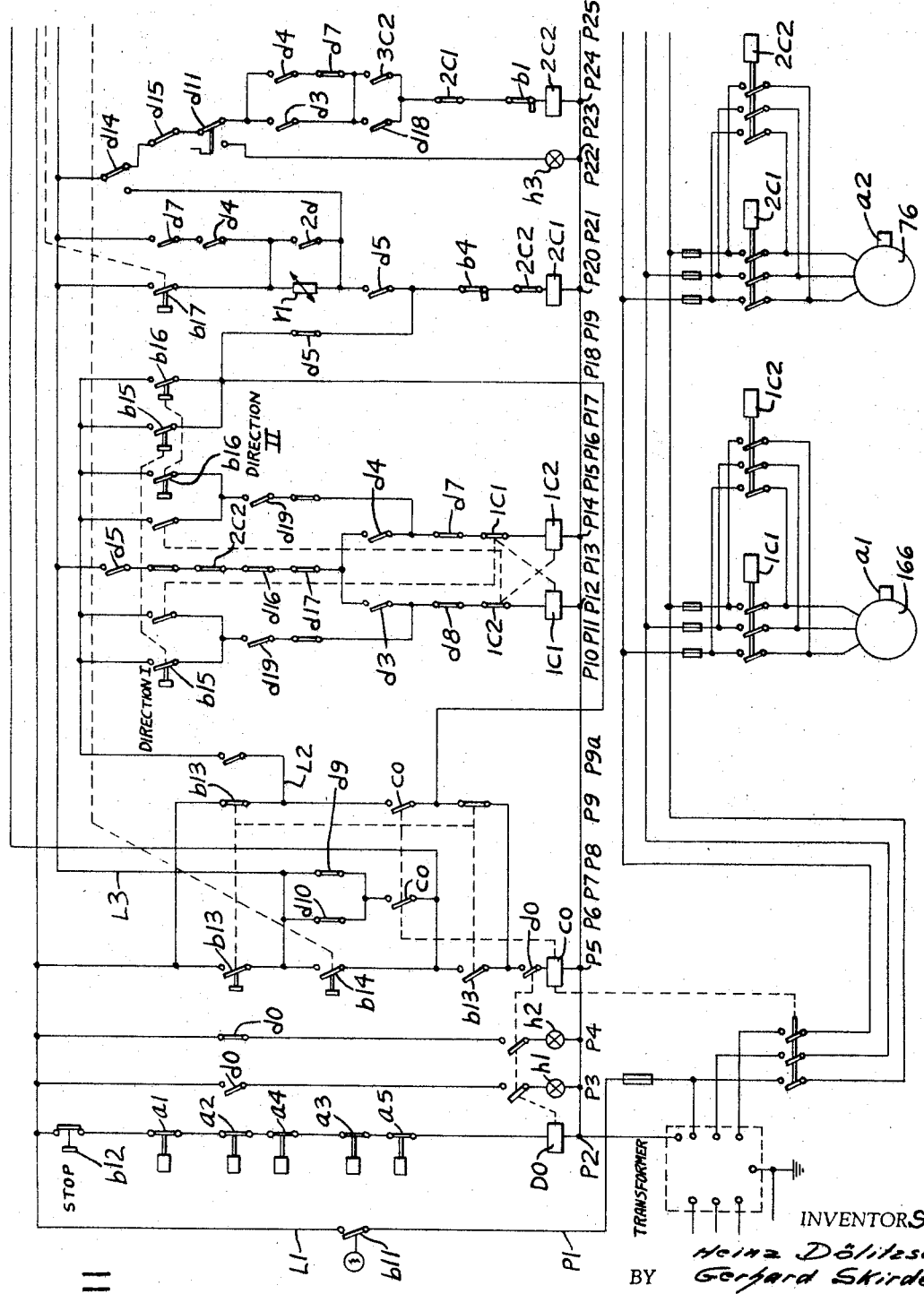

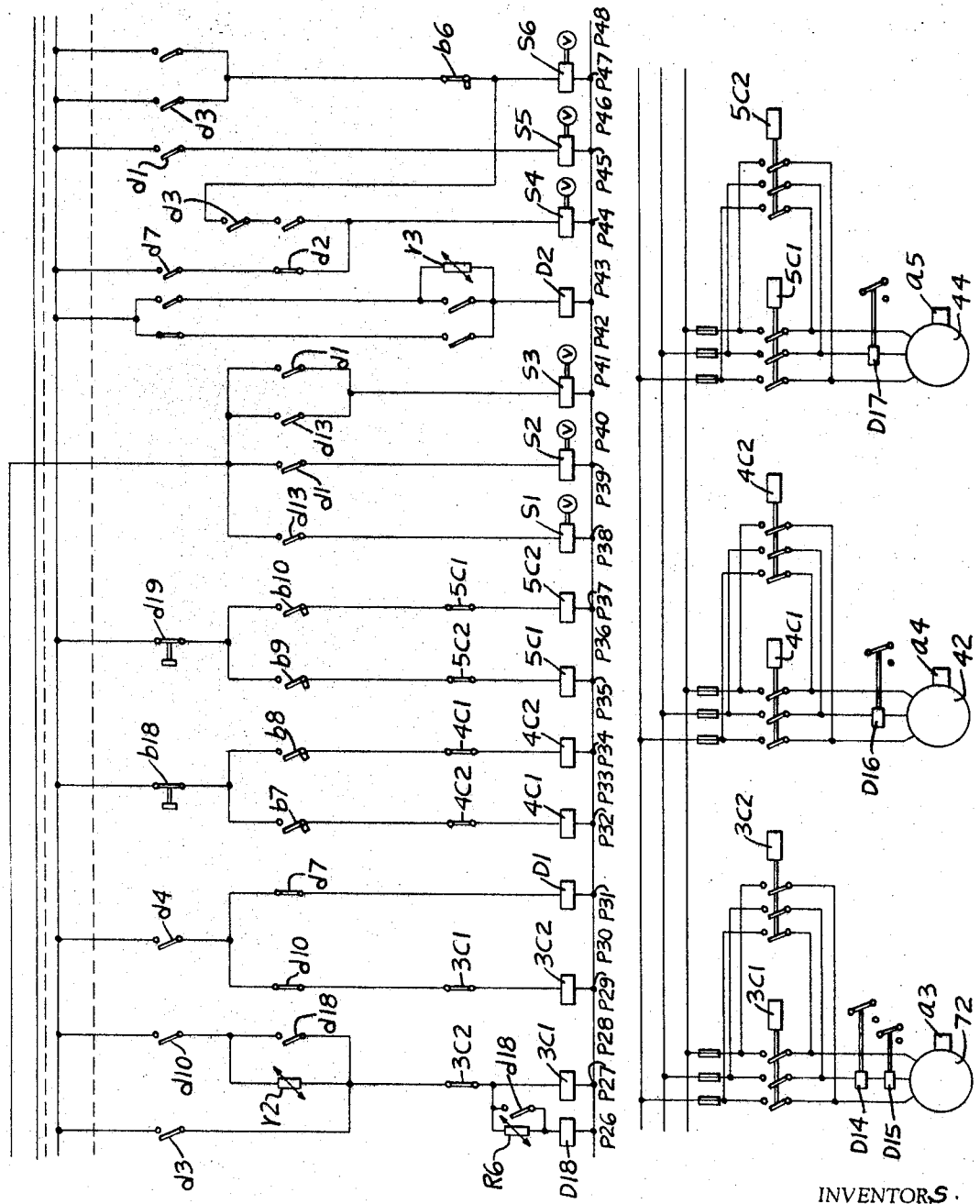

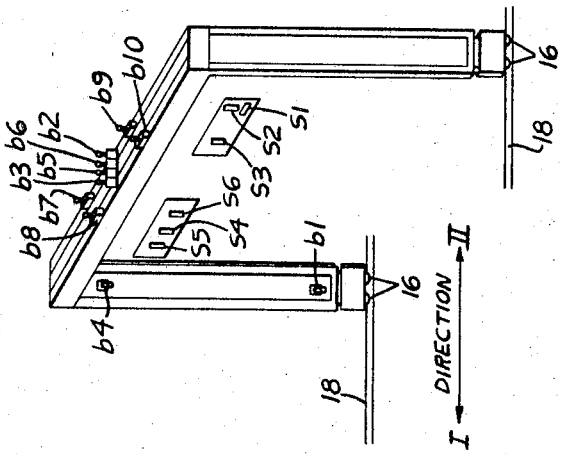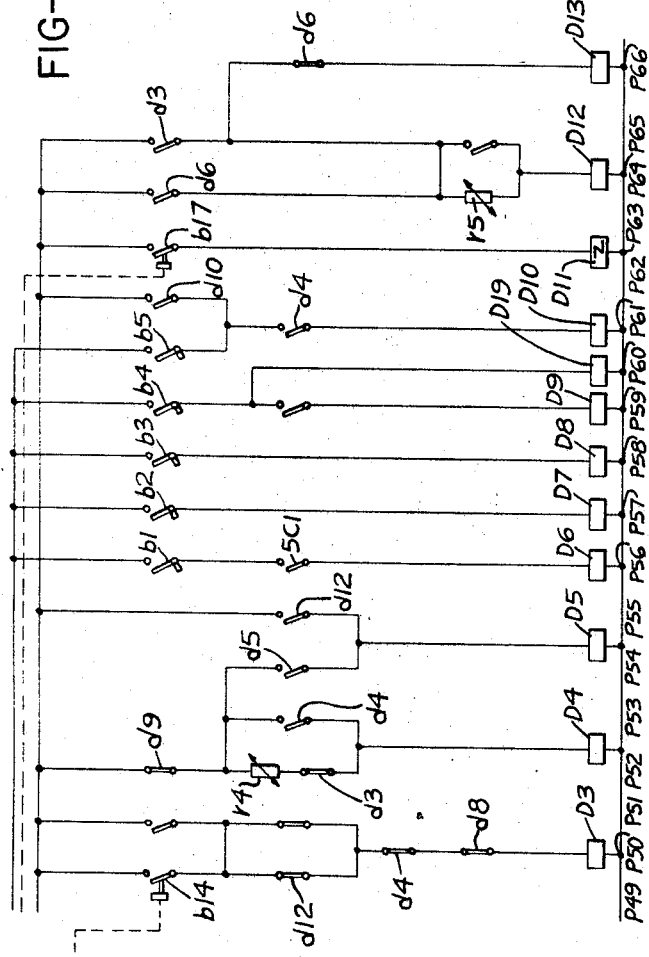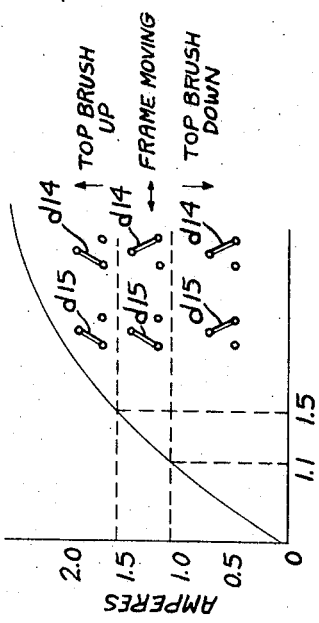

3,425,080
WASHING APPARATUS FOR VEHICLES, MORE PARTICULARLY FOR MOTOR VEHICLES
Heinz Dölitzsch, Adolfstrasse 73, and Gerhard Skirde, Osterbekstrasse 21, both of 2200 Hamburg, Germany
Continuation-in-part of application Ser. No. 484,492, May 17, 1965. This application June 9, 1967 Ser. No. 644,975
Claims priority, application Germany, May 15, 1964, D 44,442; Apr. 3, 1965, D 46,962
U.S. Cl. 15—21                                 11 Claims
Int. Cl. B60s *3/04;* A46b *13/04*

ABSTRACT OF THE DISCLOSURE

Car washing apparatus having an inverted U-shaped frame with a vertically moveable horizontal brush therein and with vertical brushes at the sides swingable into trailing relation with the vertical brush and the frame being arranged to traverse a stationary car in the longitudinal direction thereof with control provided sensitive to the load on the horizontal brush for controlling the travel of the frame and the vertical movements of the horizontal brush so that the horizontal brush takes a stepwise path and follows the profile of the vehicle.

This is a continuation-in-part of application Ser. No. 484,492, filed May 17, 1965, and now abandoned.

This invention relates to a vehicle washing apparatus and is particularly concerned with a vehicle washing apparatus which traverses a stationary vehicle from end to end in both directions for a washing operation.

Devices of the general nature referred to are known and may comprise a horizontal brush for washing the top surface of the vehicle and side brushes for washing the lateral surface of the vehicle. An inverted U-shaped, or bridge-like frame, is provided supporting the brushes so that with a vehicle parked in the proper position, the frame can be moved in the direction of the length of the vehicle while the brushes together with the supplied water and washing agent can carry out the washing operation.

Such devices heretofore, however, have not been truly automatic because the top brush was not arranged to follow the contour of all vehicles so that imperfect washing of the vehicles resulted.

The present invention is particularly concerned with improvements in vehicle washing devices of the nature referred to in which the travel of the frame and vertical movements of the horizontal brush of the device are correlated in such a manner that the horizontal brush follows the profile of the vehicle during the washing operation and results in greatly improved end results.

The primary objective of the present invention, therefore, is the provision of an improved automatic vehicle washing apparatus.

Another object of this invention is the provision of a travelling vehicle washing apparatus in which vertical movement of a horizontal washing brush and travel of the apparatus is correlated so as to cause the horizontal brush to follow the profile of the vehicle being washed.

Still another object of the present invention is the provision of novel side brushes for a washing apparatus of the nature referred to, which always trail the horizontal brush.

Still another object of the present invention is the provision of a washing apparatus of the nature referred to in which the direction of travel of the apparatus and the direction of rotation of the brushes thereof is automatically controlled.

A still further object of this invention is the provision of a washing apparatus for vehicles which can operate fully automatically, but which is subject, at all times, to manual control.

A still further object is the provision of a vehicle washing apparatus which will occupy the minimum of space in an installation and require merely the connection thereto of water, air and electricity, or electric lines, to make it operative.

The foregoing objects, as well as still other objects and advantages, of the present invention will become more apparent upon reference to the following detailed specification taken in connection with the accompanying drawings, in which:

FIGURE 2 is a side view of an installation;

FIGURE 3 is an end view thereof;

FIGURES 4, 5, 6 and 7 are schematic views showing the manner of operation of the apparatus as it traverses a vehicle fixed in one direction and then the other;

FIGURE 8 is a vertical sectional view indicated by line VIII–VIII on FIGURE 2 showing a drive arrangement for causing the apparatus to traverse the vehicle;

FIGURE 9 is a side view party broken away to show the suspension of the horizontal brush in the apparatus;

FIGURE 10 is a schematic showing of the water and air lines and valves therefor;

FIGURES 11, 11a and 11b show schematically the electric control circuit for the apparatus;

FIGURE 12 is a graph illustrating the operation of an important feature of the present invention;

FIGURE 13 is a schematic perspective view showing the bridge which forms the frame of the apparatus and illustrating the location thereon of various control limit switches.

Figure 1:
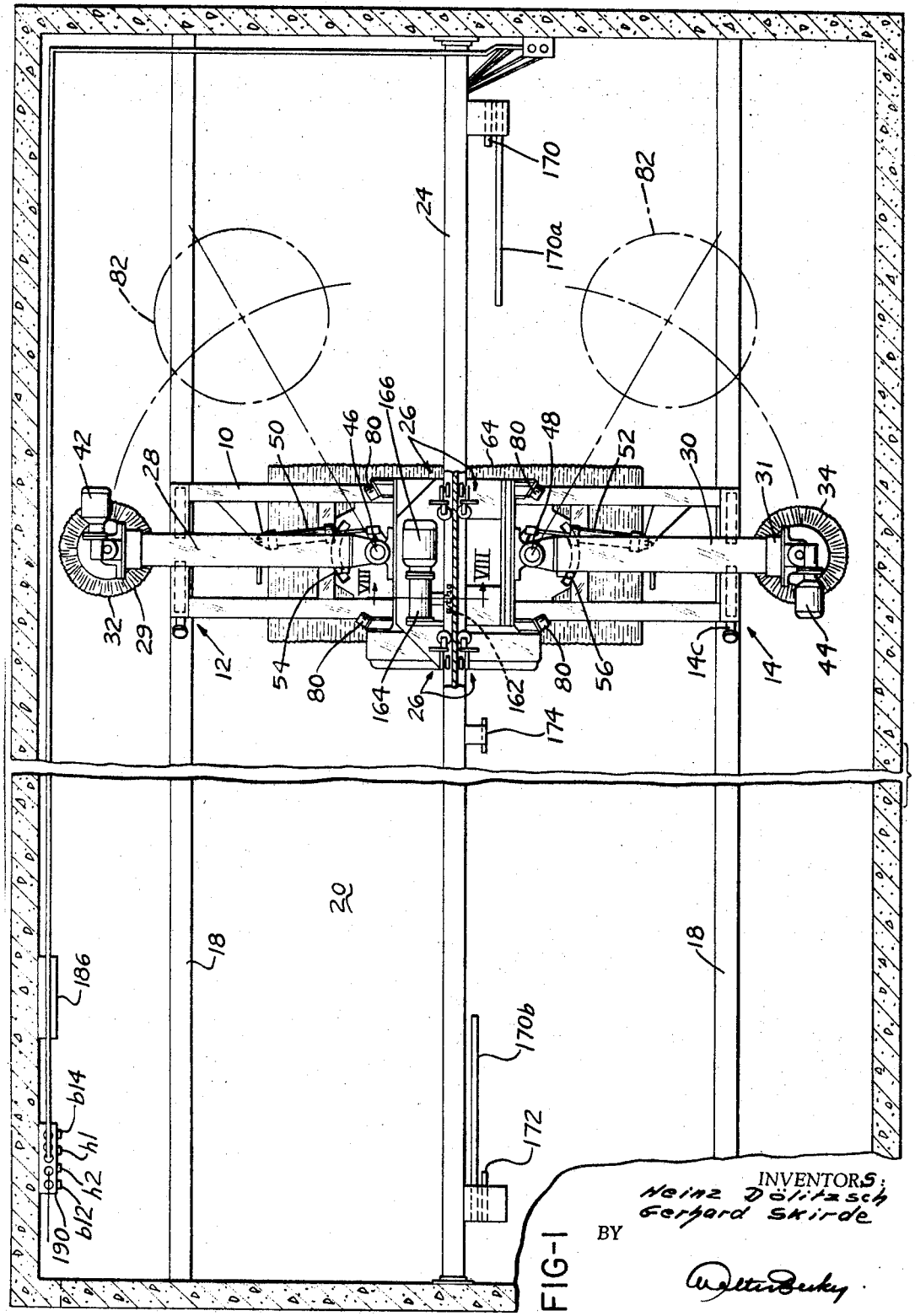
FIGURE 1 is a plan view of an installation, according to the present invention, particularly broken away to reduce the length of the view.

Referring to the drawings somewhat more in detail, and with particular reference to FIGURES 1, 2 and 3, the apparatus according to the present invention comprises an inverted U-shaped, or bridge-like frame, having a transversely extending top member 10 and vertical legs 12 and 14 dependent from the ends thereof.

At the lower ends of the legs are wheels or rollers 16 adapted for running on tracks 18 or for bearing directly on floor 20 when the floor is sufficiently hard and smooth.

The apparatus is adapted for mounting in an enclosure which also has a roof or ceiling portion 22, and attached to the ceiling portion and extending in the direction of travel of the frame is a rail 24 which may, for example, be an I beam. Mounted on top of top member 10 is a structure which includes a carriage 26 that rollingly engages I beam 24. The arrangement is such that the frame is supported in a vertical position and guided for movement in parallelism with itself and in a direction perpendicular to the plane of the bridge.

Mounted on top member 10 is a pair of arms 28 and 30 which are pivoted to the top member at their inner ends, while at their outer ends are the dependent supports 29 and 31 of supporting brushes. Vertical brushes 32 and 34 are carried on respective shafts 36 and 38 journaled in bearings 40 and each having a respective drive motor 42 and 44. The arms 28 and 30 can swing about their pivotal connection with top member 10 so as to move the vertical brushes from their idle positions wherein they are disposed laterally outwardly from the sides of the frame to positions either forwardly or rearwardly of the frame into working positions.

In FIGURE 1 the pivots for the arms are shown at 46 and 48 and it will be noted that each arm has connected thereto a respective fluid motor 50, 52 by means of which the arms swung in one direction or the other about their respective pivots.

As will be seen in FIGURE 3, each arm has a respective locking device 54, 56 by means of which the arms can be located in their idle positions.

Each of the legs of the frame, as will be seen with respect to leg 14 in FIGURE 2, is in the form of two parallel upright members 14a and 14b. At least one of these members 14a, for example, is hollow and has a filling opening 14c so that washing or drying agent in the form of liquid can be placed in the hollow leg and displaced therefrom by air pressure for being entrained in the water used in washing the vehicle.

The spaced upright portions of the legs are availed of for vertically reciprocably receiving guide blocks 60 and 62 positioned at opposite ends of a horizontal brush 64.

In FIGURE 3, brush 64 will be seen to have the ends of its shaft 66 carried in a bracket 68 which, in turn, is mounted in blocks 60 and 62.

In FIGURE 9 the shaft 66 of brush 64 will be seen to be mounted directly in block 62 with an interposed resilient cushion 70. A drive motor 72 is operatively connected with the shaft 66 for reversibly driving brush 64. It will be understood that the horizontal brush could be mounted directly in the support blocks as shown in FIGURE 9, or it could be mounted in the support blocks by means of an interposed bracket as in FIGURE 3. In either case, the blocks are vertically moveable in the legs of the frame and there is preferably a cushion interposed between the brush shaft and the blocks.

Each block has a cable 73 connected thereto leading upwardly into top member 10 and attached to a drum 74. Drums 74 are driven by a motor 76 via a self-locking speed reducing transmission 78, such as a worm and wheel.

Returning to FIGURE 1, the arms 28 and 30 are swingable about 40 degrees in either direction from the idle positions in which they are shown. The arms will swing about until they abut bumpers 80. Further limit switches, not shown in FIGURE 1, control the rotation of the vertical brushes so that during swinging movements therein they are not rotating. The horizontal brushes comprise relatively long bristles and expand in diameter when rotating, as will be seen by the dot-dash outline at 82 in FIGURE 1, which shows one brush swung into its working position and rotating.

The manner in which the vertical brushes expand when rotating is also shown in FIGURES 5, 6 and 7.

Referring to FIGURES 5, 6 and 7, the operation of the device of the present invention is shown schematically therein.

In FIGURE 4 a vehicle 90 is parked in a stationary position at the front of the apparatus which is generally designated at A.

The washing operation is initiated by advancing the apparatus until the horizontal brush engages the vehicle. The verticle brushes then swing into trailing relation with the horizontal brush and the frame moves in the direction indicated by the arrow, with the horizontal brush rotating so that the side toward the vehicle is moving in the direction of travel of the frame and with the vertical brushes rotating so that the sides thereof toward the vehicle are moving in a direction opposite to the direction of travel of the frame.

The frame traverses the vehicle from front to back in the position shown in FIGURE 5 with the horizontal brush automatically following the contour of the vehicle.

After the frame has completely traversed the vehicle, the vertical brushes are swung to their FIGURE 6 position, all of the brushes are reversed and the frame then moves from the back of the vehicle to the front. When the frame runs off the front end of the vehicle, the washing operation is completed, the vertical brushes swing to idle position and rotation of the brushes stops.

During the operation of the device, water and certain treatment agents added to the water, is supplied to the vehicle for enhancing the washing operation. FIGURE 10 schematically illustrates the supply system for water, air and the treatment materials. In FIGURE 10, 100 is the connection by which compressed air is supplied to the apparatus and 102 is the connection by means of which water is supplied to the apparatus.

The water passes through a solenoid operated valve 104 and a check valve 106 to a manifold 108 and from manifold 108 is conveyed by a conduit 110 to a spray head 112 for supplying water to the top of the vehicle. Also leading from manifold 108 are conduits 114 and 116 which lead to spray heads 118 and 120 mounted on the insides of the legs 12 and 14 of the frame so as to supply water to the sides of the vehicle.

Communicating with manifold 108 through respective relief valves are conduits 122 and 124 for the supply of treatment agents to the water. These conduits have flow control valves 126 and 128 therein and solenoid operated valves 130 and 132. Conduit 122 leads through a shut-off valve 134 to the lower portion of leg 14, whereas conduit 124 leads through a shut-off valve 136 to the lower portion of leg 12.

The treatment agent is forced from the compartments of the legs through the respective conduits and into manifold 108 by pressure supplied to the hollow legs via air pressure conduits 138 which derive pressure from conduit 100 via pressure reducing valve 140 and safety valve 142.

The aforementioned cylinders 50 and 52 for swinging arms 28 and 30 are reversibly supplied with air under pressure via conduits 144 which lead to solenoid operated valves 146 which receive air under pressure from conduit 100 through pressure reducing valve 148.

The locking devices 54 and 56 for the swingable arms receive pressure from conduit 100 through a solenoid operated valve 150 and a pressure reducing valve 152.

With respect to driving of the frame along the length of rail 24, as will be seen in FIGURE 8, a rail 24 has a chain 160 fixed to the bottom thereof which is engaged by a sprocket 162 driven through a speed reducing unit 164 by a reversible motor 166.

Rail 24 is also availed of for supporting control cams 170 at one end of the path of travel of the frame and cams 172 at the other end of the path of travel of the frame and a cam 174 intermediate the ends of the path of travel of the frame. These cams operate limit switches which control the operation of the washing apparatus.

Referring back to FIGURE 2, the compressed air and water and electrical connections to the washing device is made by a flexible combination cable indicated at 180. This combination cable hangs from carriers 182 slidable on rail 24. The water and air lines are connected to a control panel 186 having shut-off valves 188. The electric lines are connected with a control panel 190 having lamps and pushbuttons thereon.

The lamps include lamp $h1$ which illuminates when the system is in operation; lamp $h2$ which illuminates when the installation shuts down from overload; and lamp $h3$ which illuminates when the horizontal brush is taken out from under automatic control.

Pushbuttons B11 to B19 are also contained on the control panel and provide for full manual and automatic control of the installation.

The electrical control circuit is shown in FIGURES 11, 11a and 11b. The operation of important current controlling relays, is shown in FIGURE 12, and the position on the frame of the device of the various controlling limit switches is shown in FIGURE 13.

FIGURES 11, 11a and 11b, which form parts of a single wiring diagram, represents an across the line diagram in which the various branches are identified by numerals preceded by a P. The relay blades bear the same numbers as the respective relays and are shown in the position which they occupy when the respective relay is deenergized. The limit switches and pushbuttons are also all shown in non-actuated position.

Each of motors 166, 76, 72, 42 and 44 has an overload relay, $a^1$, $a^2$, $a^3$, $a^4$, $a^5$, with blades in branch line P2.

Further, each of motors 42, 44 has a current relay in circuit therewith D16, D17, with blades in P13. Still further, motor 72 has current relays D14, D15 in circuit therewith with blades in P22, P23, respectively.

All pushbuttons $b11$–$b19$ are of the spring return type except $b11$ which is key operated between open and closed positions, and $b13$ which has two stable positions.

All relays are of the conventional type, other than the current relays D14, D15, D16, D17, and D11 which is a stepping relay which alternately opens and closes its blade in P23 on successive current impulses.

In operation, closing of key switch $b11$ energizes line L1 and relay D0 (P2) will close, closing its blades in P3 and P5 and opening its blade in P4. Signal light $h1$ in P3 will light up. If stop switch $b12$ or any of the motor overload relay blades in P2 are open, relay D0 is deenergized and signal light $h1$ goes out and light $h2$ (P4) lights up.

If $b13$ (P5) is adjusted to "automatic," its blades in P5 close while its blades in P9 open. The cycle can be started by closing $b14$ (P5) which will energize relay C0 which will close its blades in P7 and P9. The blade in P7 provides a holding circuit, while the blade in P9 provides for energization of line L2. Line L3 is also energized at this time via the upper blade of $b14$ in P5.

Switch $b14$ also has a blade in P49 so relay D3 becomes energized to close its blades in P12, P23, P26, P44, P46, P51, and P65, while opening its blade in P52.

Closing of blade $d3$ in P26 causes relay 3C1 in P27 to close which will set the top brush 64 into rotation in one direction. Time delay R6 (250 msec.) in P26 causes D18 to close and close its blades in P23, P26.

The closed blades of $d3$, $d18$ in P23 energize relay 2C2 to open its blades in P13, P20, while energizing motor 76 to lower top brush 64.

The blade of $d3$ in P44 is at this time closed so that solenoid 55 for valve 146 for swinging the arms is energized. The side arms, however, can not swing because the locks therefor are still in engaged position.

The closing of the blade $d3$ in P65 brings about, through the time delay device $r5$, the energization of relay D12 about 5 seconds after $d3$ closes. The closing of D12 closes its blade in P55 and brings about energization of relay D5 which has a blade in P54 for establishing the holding circuit via blade $d9$ in P52. $d5$ remains energized until the washing process is completed and the device is returned to its starting position.

The closing of relay D5 closes its blades in P13 and P20 and thus provides the possibility of travel of the device or lifting movement of the top brush. Thus, after starting the device, a delay of five seconds occurs before the device will start to move or before the top brush will commence to lift.

Relay D13 in P66 closes when $d3$ is energized and closes its blades in P38 and P40 for energization of solenoid S1 pertaining to detergent valve 132, and solenoid S3 pertaining to the water supply.

The top brush 64 now lowers until the low limit switch $b1$ is opened or until current relay D15 in circuit with motor 72 for brush 64 indicates that the brush is subjected to a predetermined load. In any case, contacter 2C2 opens and closes its blade in P13 and contactor 1C1 is thereby closed and the unit advances in direction I which is away from its resting position toward the front end of the vehicle to be washed. When the brush 64 engages the vehicle the current input to the drive motor therefor increases and as soon as a current value of 1.5 ampere is exceeded, the blade of current relay D14 in P22 is moved to the left. When the blade of D14 and P22 moves to the left, contactor 2C1 is energized and the top brush moves upwardly while simultaneously the travelling movement of the unit is interrupted.

Vertical movement of the top brush is continued until the current input to its drive motor 72 drops to below 1.5 amperes. When this occurs, blade $d14$ returns to its right-hand position, deenergizing contactor 2C1 and again permitting energization of contactor 1C1 so that lifting movement of the top brush ceases and travelling movement of the device again starts. The two switching operations referred to repeat automatically until the top brush has reached the highest point of the vehicle being washed.

When the device has travelled about three feet from its rest position, a limit switch $b6$ on top of the unit (see FIGURE 13) is released from a control cam 170$a$ (FIGURE 1) so that solenoid S6 for valve 150 for the arm locks will be energized and release the arms. The arms will now swivel to a position where they are in trailing relation to the top brush. When the arms reach working position, limit switches $b7$ and $b9$ are closed and contactors 4C1 and 5C1 for the motors 42 and 44 are closed so that the vertical brushes rotate with their sides toward the vehicle moving in a direction opposite to the direction of travel of the vehicle.

Each vertical brush motor energizing circuit includes a respective pushbutton $b18$, $b19$, by means of which the brushes can be stopped at any time. This permits the brushes to be stopped so that they can pass over an obstruction, such as a side view mirror, on the vehicle without becoming entangled therein.

When the top brush passes the uppermost portion of the vehicle and the current to drive motor 72 for the top brush drops below about 1.1 amperes, the blade of current relay D15 will move to the right, thus causing contactor 2C2 to be energized to lower the top brush. As before, the travelling movement of the device halts until the top brush again meets resistance to rotation.

As will be seen in FIGURE 12, when both the relays D14 and D15 have their blades to the left, the top brush is moving upwardly. When both of these relays have their blades to the right the top brush is moving downwardly. When relay D14 has its blade to the right and relay D15 has its blade to the left the top brush is stationarily supported while the unit is travelling. As will be seen in the graph, the relay blades are to the left when the current to motor 76 is in excess of about 1.5 amperes and both thereof are to the right when the current to the said motor is less than about 1.1 amperes. When the current to the motor is between about 1.1 amperes and about 1.5 amperes the top brush is stationarily supported while the unit is travelling in either one direction or the other.

When the top brush runs off the back end of the vehicle and lowers until lower limit switch $b1$ is actuated, relay 2C2 is deenergized, while relay D6 in P56 is also energized. The unit, however, continues to move in direction I until contact D3 and P12 opens. When contact D6 is energized, its blade in P66 opens and relay D13 is deenergized and its contacts in P38 and P40 open and the solenoids S3 and S1 for the water and washing agent valves are deenergized and these valves close.

The blade of D6 in P64 closes and after a delay of five seconds as caused by time delay device $r5$, auxiliary relay D12 is energized.

Opening of the blade of D12 in P49 will deenergize relay D3. The same effect will also be obtained when the unit reaches limit switch $b3$ which determines the end of the movement thereof in direction I. At this time relay D8 is energized and its blade in path 50 deenergizes relay D3 so that contactor 1C1 for energizing motor 166 to advance the unit in direction I is deenergized. Contactor 3C1 is also deenergized so that rotation of the top brush is halted.

Still further, solenoid S4 for the swinging movement of the arms is deenergized and likewise solenoid S6 for the arm locking devices is deenergized.

The closed blade of D3 in P52 causes relay D4 to be energized after a predetermined time delay as determined by delay unit r4, and this causes the following functions to be initiated:

The blade of D4 in P14 closes for contactor 1C2 for travelling movement II.

The blade of D4 in P30 closes for contactor 3C2 for rotating the top brush during the return movement of the device.

The blade of D4 in P30 causes energization of relay D1 so that the blades of D1 and P39 and P41 close and the solenoids S2 and S3 for the treatment agent and water are energized.

The blade of relay D4 in P25 closes and completes the circuit through contactor 2C2 for lowering movement of the brush when relay D15 is energized.

Limit switch b6 is at this time engaged by the switch rail 170b and is thus held open so that the arms can not swing past their rest position. After a travel of about three feet of the unit in direction II, switch b6 is released and the locks for the arms will be released and the arms will swivel to working position, whereupon limit switches b8 and b10 will be closed for contactors 4C2 and 5C2 and set the vertical brushes into rotation in a direction opposite to which they rotated during the travel of the unit in direction I.

Each of the circuits for motors 42 and 44 include the current relays D16, D17 with blades in P13 which will open and interrupt the travelling movement of the device if either of these motors is overloaded. Continued overload of the motors will, of course, actuate their respective overload relays a4, a5 to interrupt the operation of the entire operation.

When the unit starts its travel in direction II, which is from its position beyond the rear end of the vehicle in the forward direction, the top brush will first engage the rear end of the vehicle and when the current input to the top brush motor rises, the travel of the unit will be interrupted and the top brush will rise. At about the time the top brush is above the rear end of the vehicle and about the level of the rear window, limit switch b5 on top of the unit is tripped by a cam on rail 24 and relay D10 is energized. Relay D10 holds through its own blade in P62 after limit switch b5 is released. The blade of D10 in P6 opens and the current supply to main contactor C0 is now effected via the blade of d9 in P8.

The blade of D10 in P29 opens and contactor 3C2 is, thus, deenergized. The blade of D10 in P28 closes and the time delay connections r2 is effective for causing energization of contactor 3C1 after delay of about one-quarter second. During this period no lowering movement of the top brush can be effected because the blade of 3C2 in P25 is open and the blade of D18 will only close when relay D18 is energized. Relay D18 will be energized after about one-quarter second after contactor 3C1 is energized.

After the foregoing switching operations are completed, the unit continues its washing operation in direction to and returns to the original position from which it started. As soon as the unit reaches its rest position, switch b2 is actuated and the relay D7 is energized.

The blade of D7 in P14 opens and deenergizes contactor 1C2.

The blade of D7 in P25 opens and deenergizes the contactor 2C2.

The blade of relay D7 in P21 closes and energizes contactor 2C1 via the time delaying connection r1. When the top brush reaches its uppermost position, limit switch b4 is opened thereby and deenergizes the lifting contactor 2C1.

The blade of D7 in P31 opens and auxiliary relay d1 is deenergized and the valve solenoids S2, S3 and S5 are all deenergized.

The blade of D7 in P43 closes and via a twenty-five second time delay r3 energizes relay D2. The blade of D2 in P43 opens and deenergizes solenoid S4 so that the arms can again swing to their rest position.

When limit switch b4 is closed by upward movement of the top brush, relays D9 and D19 are energized. At this point all contactors and relays, with the exception of relays D0, D7, D9 and D19, are deenergized and the washing process is ended.

Operation of pushbutton b17 will operate the impulse relay D11 in P63 and interrupt the current path for contactor 2C2. The lifting contactor 2C1 is also energized through the one quarter second time delay connection r1. The top brush thus rises to its uppermost position and the yellow signal lamp h3 becomes illuminated. Lifting of the top brush in the aforesaid manner is resorted to when there is an aerial or the like extending up from the top of the vehicle which will not permit the top brush to be run over the vehicle. The washing operation continues while the top brush is in elevated position. When pushbutton b17 is again depressed, the impulse relay D11 switches again and normal automatic operation will again commence.

When the hand automatic switch b13 is in manual position, the only operation that can be carried out are the traversing of the unit which is effected by the pushbuttons b15 and b16. These pushbuttons are, however, only effective when the top brush is in its uppermost position so that relay D19 is energized and its blades d19 in P11 and P15 are closed.

If, when manual operation is commenced, the top brush is below its upper position, it will first move upwardly until limit switch b4 is actuated. With the brush in its uppermost position, the unit, once set in motion in one direction or the other, will continue until switched off by the end switches b2 or b3, or by depressing stop button b12 in P2.

It will be apparent that certain modifications could be made in the illustrated and described arrangement without in any way departing from the spirit of the invention. For example, while the device is shown as being driven in its traversing movement by a sprocket and chain at the top of the frame of the device, it would be possible, as well, to drive the device by driving one or more of the supporting wheels therefor at the bottom.

Still further, an endless cable drive could be incorporated in the upper supporting rail 24 for the frame of the device or adjacent thereto. In either case the movement of the device could be controlled in the same manner as has been described in connection with the electrical circuit.

Still further, the top brush has been illustrated as having current relays in circuit with the drive motor therefor for detecting the resistance to rotation of the brush, thereby to determine when the top brush is engaging the vehicle with the right amount of pressure to carry out a washing operation.

It will be evident, however, that the top brush could be moveably supported so that displacement thereof would indicate the amount of load thereon and the lifting and lowering of the top brush and the travel of the frame of the vehicle controlled in accordance therewith.

Various other modifications will suggest themselves to those skilled in the art and it is, accordingly, intended to include within the purview of the present invention such modifications and adaptations of the device as may be considered to fall within the scope of the appended claims.

What is claimed is:

1. A washing apparatus for vehicles comprising; a frame in the form of a laterally extending top member and laterally spaced vertical legs dependent from the ends of said top member, first support means supporting said frame for movement in parallelism with itself and in a direction perpendicular to the plane thereof so as to cause the frame to traverse a vehicle from end to end with the legs of the frame on opposite sides of the vehicle, vertical brushes carried by said frame for engagement with the sides of the vehicle being washed and first motor means for rotating said vertical brushes, a horizontal brush in the frame extending laterally between said legs, second motor means for rotating said horizontal brush, second support means supporting said horizontal brush in the frame for vertical movement therein and including third motor means for raising and lowering said horizontal brush in the frame, fourth motor means for driving said frame on said first support means, and control means responsive to the pressure of said horizontal brush against a surface of a vehicle being worked for controlling the said third motor means and said fourth motor means to cause said horizontal brush to follow the contour of the vehicle.

2. An apparatus according to claim 1 in which said control means comprises a current relay in circuit with said second motor means.

3. An apparatus according to claim 2 in which said frame comprises horizontal arms swingably connected to said frame at the top, said vertical brushes being dependent from the outer ends of said arms, and means for swinging said arms on said frame to move said vertical brushes from an idle position outside said legs to working positions in front of or behind said legs.

4. An apparatus according to claim 1 in which said second support means includes support blocks at the ends of said horizontal brush guided on said legs for vertical movement, said horizontal brush having a shaft journalled in said blocks, cables connected to said blocks, drum means on said top member to which said cables are attached, said third motor means comprising a reversible electric motor, and a self-locking transmission connecting said third motor means to said drum means.

5. An apparatus according to claim 4 which includes resilient means interposed between said shaft and said blocks.

6. An apparatus according to claim 1 in which said second support means includes support blocks at the ends of said horizontal brush guided on said legs for vertical movement, said horizontal brush having a shaft journalled in said blocks, and said third motor means comprising fluid motors in said frame connected to said blocks for raising and lowering said horizontal brush in the frame.

7. An apparatus according to claim 1 in which said frame comprises switch means for detecting predetermined uppermost and lowermost position of said horizontal brush therein, and means operated by said switch means for controlling the direction in which said frame is driven by said fourth motor means and the direction in which said horizontal brush and said vertical brush are driven in rotation by said first motor means and said fourth motor means, respectively.

8. An apparatus according to claim 3 in which said means for swinging said arms comprises fluid operable piston and cylinder means connected between said arms and said frame, and switches in circuit with said first motor means for controlling the energization thereof and positioned for engagement by said arms when the arms are swinging into working position, said vertical brushes swinging free of said legs when moving between their idle and working positions.

9. An apparatus according to claim 1 in which said first support means comprise a stationary rail extending in the direction of movement of the frame and above said top member, means on the top member engaging said rail, a chain fixed to the bottom of the rail, a sprocket on the top member engaging said chain, and said fourth motor means being connected to said sprocket.

10. An apparatus according to claim 1 in which said legs are hollow for receiving treatment means such as concentrated washing and rinsing compositions, means for supplying water to at least said horizontal brush, and means for carrying predetermined amounts of said treatment means to said water prior to delivery thereof to said horizontal brush.

11. An apparatus according to claim 10 which includes spray means on said legs for spraying the side surfaces of a vehicle being washed, and means for conveying a portion of the water and the entrained treatment means to said spray means.

References Cited

UNITED STATES PATENTS

| 3,187,359 | 6/1965 | Takeuchi | 15—21 |
| 3,251,084 | 5/1966 | Larson et al. | 15—21 |

FOREIGN PATENTS

| 1,191,065 | 4/1959 | France. |
| 1,236,015 | 6/1960 | France. |

EDWARD L. ROBERTS, *Primary Examiner.*